United States Patent
Schipunov et al.

(10) Patent No.: US 7,624,118 B2
(45) Date of Patent: Nov. 24, 2009

(54) DATA PROCESSING OVER VERY LARGE DATABASES

(75) Inventors: Vladimir Schipunov, Seattle, WA (US); Thomas H. Hargrove, Kirkland, WA (US); Rajeev Prasad, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 11/460,070

(22) Filed: Jul. 26, 2006

(65) Prior Publication Data

US 2008/0027920 A1  Jan. 31, 2008

(51) Int. Cl.
*G06F 17/00* (2006.01)
*G06F 7/00* (2006.01)

(52) U.S. Cl. .............. 707/101; 707/4; 707/6; 707/104.1

(58) Field of Classification Search .......... 707/104
See application file for complete search history.

(56) References Cited

U.S. PATENT DOCUMENTS

| | | | |
|---|---|---|---|
| 5,471,677 A | | 11/1995 | Imanaka |
| 5,832,182 A | * | 11/1998 | Zhang et al. ............. 706/50 |
| 5,845,113 A | * | 12/1998 | Swami et al. ............. 707/7 |
| 6,047,323 A | * | 4/2000 | Krause ................. 709/227 |
| 6,052,681 A | | 4/2000 | Harvey |
| 6,081,788 A | * | 6/2000 | Appleman et al. .......... 705/14 |
| 6,081,801 A | | 6/2000 | Cochrane et al. |
| 6,112,198 A | | 8/2000 | Lohman et al. |
| 6,212,526 B1 | | 4/2001 | Chaudhuri |
| 6,263,327 B1 | | 7/2001 | Aggarwal |
| 6,266,668 B1 | * | 7/2001 | Vanderveldt et al. ........ 707/10 |
| 6,438,705 B1 | * | 8/2002 | Chao et al. ............... 714/4 |
| 6,687,693 B2 | | 2/2004 | Cereghini |
| 6,718,322 B1 | | 4/2004 | Brye |
| 6,732,084 B1 | | 5/2004 | Kabra et al. |
| 6,768,986 B2 | | 7/2004 | Cras |
| 6,954,752 B2 | * | 10/2005 | Iyengar ................ 707/8 |
| 7,013,308 B1 | | 3/2006 | Tunstall-Pedoe |
| 7,028,030 B2 | * | 4/2006 | Jacobs et al. ............ 707/8 |
| 2003/0078985 A1 | * | 4/2003 | Holbrook et al. .......... 709/213 |
| 2003/0115194 A1 | * | 6/2003 | Pitts et al. ............. 707/3 |
| 2005/0120025 A1 | | 6/2005 | Rodriguez |
| 2005/0204186 A1 | * | 9/2005 | Rothman et al. .......... 714/7 |

(Continued)

FOREIGN PATENT DOCUMENTS

WO  WO 95/09395  4/1995

OTHER PUBLICATIONS

International Search Report for PCT Application No. WO 95/09395 dated Nov. 27, 2007, 3 pages.

(Continued)

*Primary Examiner*—Greta L Robinson
*Assistant Examiner*—James J Wilcox
(74) *Attorney, Agent, or Firm*—Shook, Hardy & Bacon LLP

(57) ABSTRACT

A system that facilitates data processing includes a receiver component that receives an SQL query. A partitioning component partitions the SQL query into multiple tasks and provides the tasks to multiple cluster nodes for processing. The system enables very large amounts of data (e.g., multiple terabytes) to be quickly prepared for analytical processing, such as for use in connection with a search engine, an advertisement provision system, etc.

17 Claims, 13 Drawing Sheets

U.S. PATENT DOCUMENTS

2005/0262108 A1    11/2005  Gupta
2006/0047780 A1*   3/2006  Patnude ...................... 709/219
2007/0033531 A1*   2/2007  Marsh ........................ 715/738

OTHER PUBLICATIONS

Angoss Software Corporation. White Paper: A New Generation of Data Mining Technologies. http://www.dmreview.com/whitepaper/paper_sub.cfm?whitepaperId=10063. Last accessed Apr. 24, 2006.

HP NonStop SQL Software. http://h71028.www7.hp.com/ERC/downloads/4AA0-2329ENW.pdf, Sep. 2005. Last accessed Apr. 24, 2006.

Jiawei Han. Towards On-Line Analytical Mining in Large Databases. http://delivery.acm.org/10.1145/280000/273273/P097.pdf?key1=273273&key2=8232785411&coll=GUIDE&dl=GUIDE&CFID=74393205&CFTOKEN=24222925. Last accessed Apr. 24, 2006.

* cited by examiner

DATA PROCESSING OVER VERY LARGE DATABASES

BACKGROUND

Advancements in networking and computing technologies have enabled transformation of computers from low performance/high cost devices capable of performing basic word processing and executing basic mathematical computations to high performance/low cost machines capable of a myriad of disparate functions. For example, a consumer level computing device can be employed to aid a user in paying bills, tracking expenses, communicating nearly instantaneously with friends or family across large distances by way of email or instant messaging, obtaining information from networked data repositories, and numerous other functions/activities. Computers and peripherals associated therewith have thus become a staple in modern society, utilized for both personal and business activities.

Additionally, electronic storage mechanisms have enabled massive amounts of data to be accumulated by individuals and/or companies. For instance, data that previously required volumes of books for recordation can now be stored electronically without expense of printing paper and with a fraction of physical space needed for storage of paper. In one particular example, deeds and mortgages that were previously recorded in paper volumes can now be stored electronically. Moreover, advances in sensors and other electronic mechanisms now allow massive amounts of data to be collected and stored. For instance, GPS systems can determine location of an individual or entity by way of satellites and GPS receivers, and electronic storage devices connected thereto can then be employed to retain locations associated with such systems. Various other sensors and data collection devices can also be utilized for obtainment and storage of data.

Some business models rely heavily on their ability to process extremely large amounts of data. For instance, a search engine can collect a significant amount of data relating to millions of users, such as age, demographic information, and the like. In another example, a database that tracks alterations in the stock market can be associated with a tremendous amount of data, particularly if such tracking is done in a granular manner. If one desires to retrieve a particular entry or multiple entries from this collection of data, they can generate a query in a particular database query language, and data is organized and extracted from the database according to the query.

When there is a small amount of data, such as within a spreadsheet application, this data processing can be undertaken quite quickly. When an amount of data becomes quite large, however (e.g., multiple terabytes), processing such data can be computationally expensive and require a great deal of time. One conventional manner for reducing processing time relates to selecting a sample set of the data and performing processing on such sample set, wherein a size of the sample set can be dependent upon an amount of time necessary to process such sample set. While this reduces processing time, accuracy will be compromised, particularly in data mining applications. Another available approach is to reduce functionality and thereby lower computing resources necessary to process large amounts of data.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its sole purpose is to present some concepts in a simplified form as a prelude to the more detailed description that is presented later.

The claimed subject matter generally relates to preparing very large amounts of data (e.g., in the order of terabytes) for analytical processing, such as a data mining application. To enable such processing in an efficient (and relatively inexpensive) manner, commodity computing devices are hierarchically arranged and processing tasks are split amongst such computing devices. In greater detail, a client can provide an SQL query to a computing node (which can be a computer, a portion of a computer, . . . ) that acts as a master node, wherein the master node analyzes the SQL query and determines a plurality of tasks that are related to the SQL query (or "make up" the SQL query). The SQL query can be a pre-defined query that is associated with one or more users or other subject matter where use of particular SQL queries may be desired.

Once the master node has determined the tasks, such tasks can be placed in a queue associated with the master node and provided to a plurality of cluster nodes (nodes that are subservient to the master node). For instance, tasks can be assigned to particular cluster nodes and/or cluster nodes can request certain tasks. In more detail, the cluster nodes can be associated with data partitions that certain tasks are designed to execute over. In an example, upon loading data from a web server, one or more sort algorithms can be utilized to assign particular data partitions to certain cluster nodes, wherein the cluster nodes request and/or are assigned specific tasks pertinent to the data partitions. Thus, tasks can be performed much more expediently by the cluster nodes when compared with conventional systems/methods.

Additionally, cluster nodes can act as master nodes with respect to other cluster nodes. For instance, a cluster node can receive a task from the master node, and such cluster node can determine multiple sub-tasks based upon the received task. These sub-tasks can then be provided to sub-cluster nodes according to data partitions associated therewith. The sub-clusters can request certain tasks that are retained within a queue of a "parent" cluster node and/or can be assigned task from a "parent" cluster node. As before, unreliable or one-way messaging can be utilized to effectuate communications between cluster nodes, cluster nodes and sub-cluster nodes, and/or between sub-cluster nodes.

To the accomplishment of the foregoing and related ends, certain illustrative aspects are described herein in connection with the following description and the annexed drawings. These aspects are indicative, however, of but a few of the various ways in which the principles of the claimed subject may be employed and such subject matter is intended to include all such aspects and their equivalents. Other advantages and novel features may become apparent from the following detailed description when considered in conjunction with the drawings.

DETAILED DESCRIPTION

Figure 1:
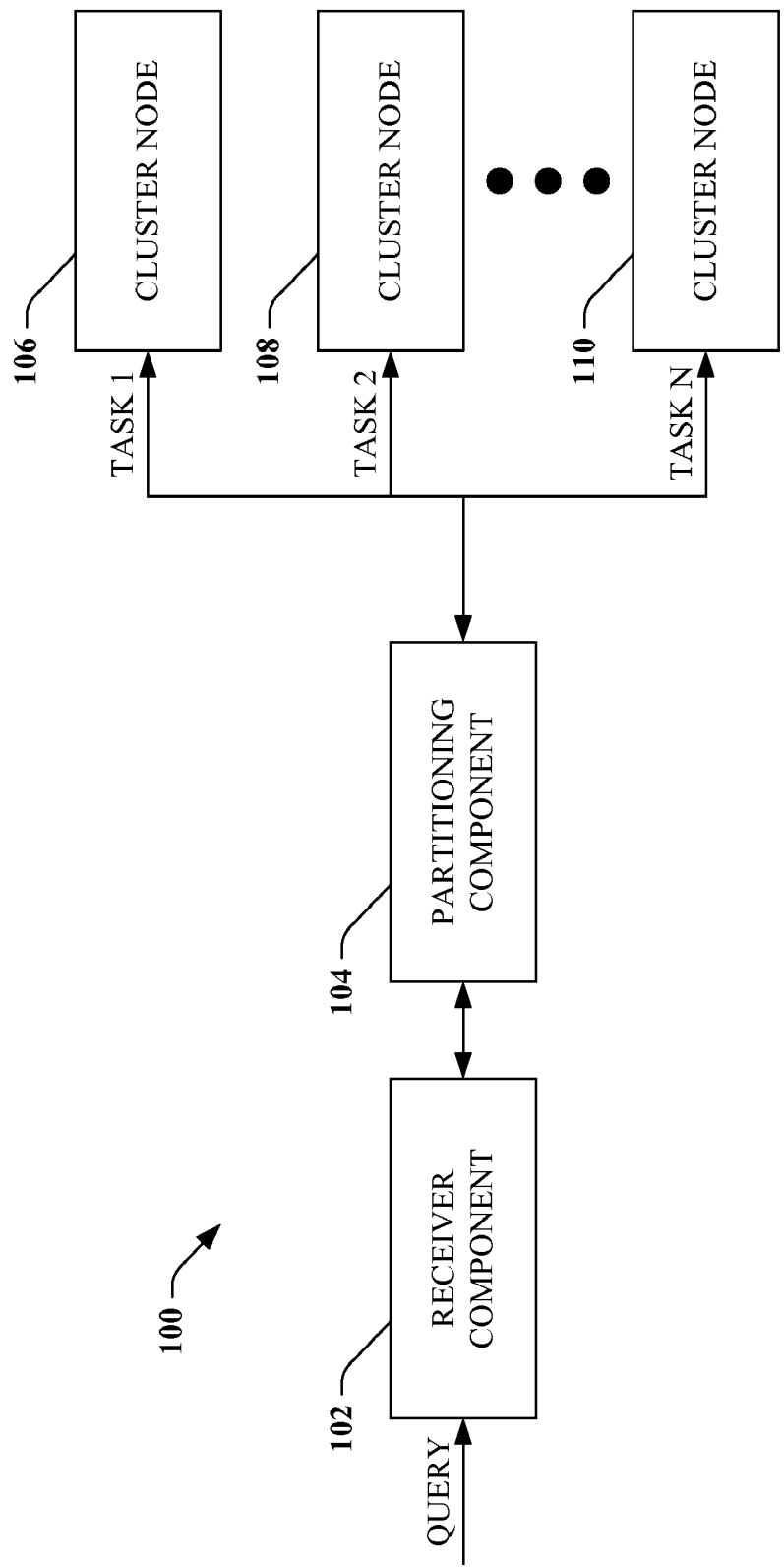
FIG. 1 is a high-level block diagram of a system for processing very large amounts of data.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, or any combination thereof to control a computer to implement the disclosed invention. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips...), optical disks (e.g., compact disk (CD), digital versatile disk (DVD), ... ), smart cards, and flash memory devices (e.g., card, stick, key drive...). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings, FIG. 1 illustrates a system 100 that facilitates processing of large amounts of data (e.g., multiple terabytes of data). As described above, conventionally samples of a data set are prepared to perform data mining tasks on large amounts of data; however, accuracy is compromised when less than an entirety of available data is processed. The system 100 is constructed in such a manner that an entirety of a data set can be processed efficiently and with relatively low-cost computing devices.

The system 100 includes a receiver component 102 that receives a query in a database query language, such as SQL. Conventionally, such a query is executed against an entirety of a collection of data and/or a sample thereof. The system 100 enables efficient execution of queries over extremely large amounts of data through utilization of a partitioning component 104, which can analyze the query received by the receiver component 102 and partition such into a plurality of tasks. The plurality of tasks, when executed against the collection of data, can provide a substantially similar result as if the query alone were executed against the collection of data. The receiver component 102 and the partitioning component 104, as described in greater detail below, can be resident within a master node that can assign tasks, aggregate data resultant from executing a task, and providing aggregated data to a client.

After the partitioning component 104 has defined the plurality of tasks, one or more of the tasks can be assigned to one or more cluster nodes 106-110. The cluster nodes 106-110 can be, for example, individual computers, separate computing entities within a common casing, separate logical processes, and/or the like. In another example, rather than tasks being assigned to the cluster nodes 106-110, the cluster nodes 106-110 can retrieve tasks from a task queue (not shown). Therefore, when a cluster node has completed a task, such node can request another task, thereby increasing efficiency by ensuring that a single cluster node is not overloaded with multiple tasks while another cluster node remains idle.

Additionally, one or more of the cluster nodes 106-110 can be associated with one or more sub-cluster nodes, thereby enabling a computing node to act both as a cluster node and as a master node. For instance, the cluster node 106 can receive or retrieve multiple tasks in connection with processing data. The cluster node 106 can perform a subset of the tasks and assign or make available other tasks to sub-clusters that reside in a lower rung of an architectural hierarchy from the cluster node 106. The cluster node 106 can then aggregate data provided from sub-cluster nodes with data resultant from execution of tasks performed by the cluster node 106 itself. Such aggregated data can then be provided to a node above the cluster node 106 in the hierarchy.

This hierarchical arrangement of computing nodes enables a collection of low-cost machines to process a substantial amount of data efficiently. To further enhance efficiency of processing, unreliable messaging can be utilized amongst nodes (e.g., no handshaking, confirmation receipts, ... ). Rather, nodes can perform a monitoring operation that ensures that data resulting from execution of a task is received within a threshold period of time. Use of unreliable messaging can enable the cluster nodes 106-110 to perform a greater amount of processing tasks when compared with conventional systems.

Still further, the system 100 can be associated with either a "shared nothing" data storage architecture or a "shared storage" data storage architecture. "Shared nothing" architecture results when each cluster node 106-110 (and associated sub-cluster nodes) includes data storage and retains data for processing, wherein there is no central data store shared by the cluster nodes 106-110. "Shared storage" architecture relates to when the cluster nodes 106-110 share storage space, such as on a server. The system 100 can utilize commodity computing systems, thereby maintaining low costs (but maintaining adequate performance due to the architecture of the system 100).

In summary, various applications require vast computing resources. For instance, scoring user interest with respect to an item based upon user activity tracked in search engine log files requires a significant amount of processing. For example, search engine companies can collect a significant number of individual events relating to user activity, such as Uniform Resource Locators (URLs) visited, search queries executed, advertisements provided to a user, advertisements selected by the user, and/or the like. One or more interests of the user can be inferred through data mining and predictive modeling techniques, but preparing large volumes of data for analytical processing is a non-trivial task. For instance, the log file data must be parsed, cleansed, sorted, loaded, merged with other types of data, and aggregated. The system 100 facilitates end to end support of such tasks by partitioning a database query into several tasks, wherein such tasks are executed in parallel.

Figure 2:
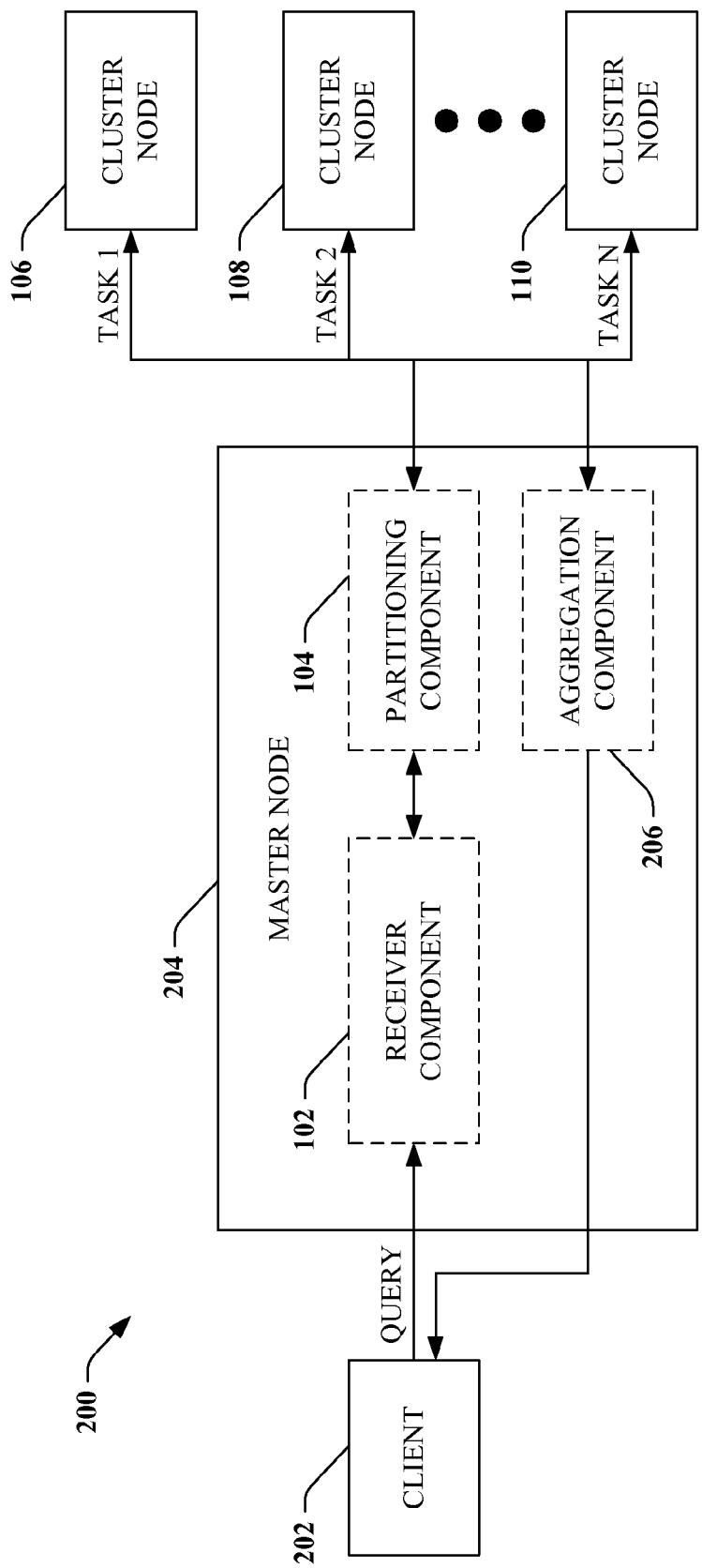
FIG. 2 is a block diagram of a system for preparing large amounts of data for analytical processing.

Turning now to FIG. 2, a system 200 that facilitates preparing very large amounts of data for analytical processing is illustrated. The system 200 includes a client 202, wherein an SQL query can be received from such device. In an example, the client 202 can be an OLE DB client, wherein OLE DB is a set of interfaces that enables access of different types of data in a uniform manner. The SQL query is receive by the receiver component 102, which is included within a master node 204. As described above, the master node 204 can be a single computing device, multiple computing devices that act as one computing device, etc.

The master node 204 can additionally include the partitioning component 104, which can determine what data is needed to process the received SQL query, and can partition the query into multiple tasks such that the query is processed. The partition component 104 can then assign the tasks to the one or more cluster nodes 106-110. In another example, the cluster nodes 106-110 can request tasks from the master node 204 and/or pull tasks from the master node 204. The cluster nodes 106-110 can complete the tasks and provide results from such tasks back to the master node 204. The master node 204 includes an aggregation component 206 that can aggregate data returned from the cluster nodes 106-110 and provide such aggregation to the client 202. Aggregated data can thereafter be employed in connection with data mining and predictive modeling applications.

Additionally, it is to be understood that one or more of the cluster nodes 106-110 can act as a master node with respect to sub-cluster nodes beneath the cluster nodes 106-110 within a logical hierarchy. Pursuant to an example, the cluster node 108 can include the receiver component 102, which is configured to receive one or more tasks associated with the SQL query provided by way of the client 202. The cluster node 108 can also include the partitioning component 104, which partitions the task into a plurality of sub-tasks. The cluster node 108 can then execute one or more of the sub-tasks and/or assign sub-tasks to cluster nodes (not shown) beneath the cluster node 108 in the logical hierarchy. The cluster node 108 can receive data resultant from execution of the sub-tasks and aggregate such data, and thereafter provide the aggregated data to a computing entity above the cluster node 108 in the hierarchy (e.g. the master node 204). Thus, any computing node that is associated with nodes lower in the hierarchy than such computing node can act as a master node by partitioning queries/tasks and aggregating data.

Figure 3:
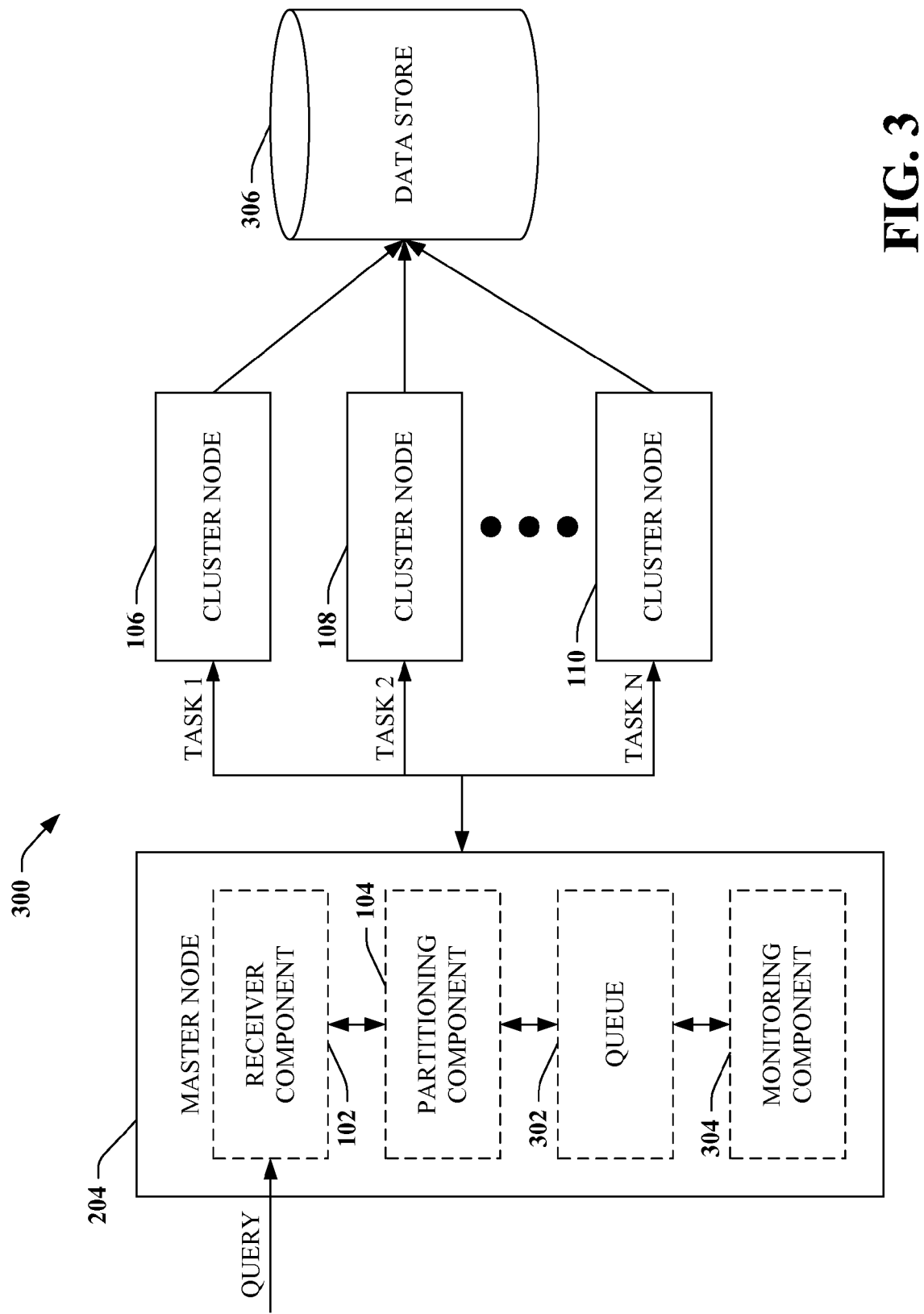
FIG. 3 is a block diagram of a system that uses a shared storage architecture in connection with processing very large amounts of data.

Now turning to FIG. 3, a system 300 for preparing very large collections of data (multiple terabytes) for analytical processing is illustrated. The system 300 is provided to illustrate that a shared storage architecture can be utilized in connection with the claimed subject matter. The system 300 includes the master node 204, which in turn includes the receiver component 102 that receives a query (from an OLE DB client, for example). The partitioning component 104 is communicatively coupled to the receiver component 102 and partitions the received query into multiple tasks. For instance, the tasks can be previously defined in accordance with certain query constructs.

The master node 204 can additionally include a task queue 302, which can retain tasks that have not been assigned to any of the cluster nodes 106-110 and/or retrieved by any of the cluster nodes. For example, if the cluster nodes 106-110 actively retrieve tasks, such tasks can be arranged in order of importance. Alternatively, the cluster nodes 106-110 may be configured to perform particular tasks, and can analyze contents of the queue for such tasks. The queue 302 can also be associated with a monitoring component 304 that monitors the queue 302 to ensure that tasks are being assigned and/or clusters are retrieving tasks. Additionally, the monitoring component 304 can monitor a number of tasks taken on by or assigned to certain cluster nodes 106-110 to ensure efficient data processing. Still further, the monitoring component 304 can monitor the cluster nodes 106-110 to ascertain whether particular tasks are being completed within a threshold amount of time. For instance, the system 300 can utilize unreliable messaging (one way messaging)—therefore it is possible that noise causes a cluster node 106 to improperly receive a task assignment. The monitoring component 304 can cause the master node 204 to resend a task or place the task within the queue 302 if the task is not completed in a particular amount of time.

As described above, the cluster nodes 106-110 can receive tasks associated with the query and process such tasks. Further, one or more of the cluster nodes 106-110 can receive multiple tasks and assign a subset of the tasks to one or more sub-cluster nodes. Additionally or alternatively, the cluster nodes 106-110 can further partition the tasks into sub-tasks and assign such sub-tasks to sub-cluster nodes (not shown). The system 300 also includes a data store 306 that is shared amongst the cluster nodes 106-110. Thus, for instance, the cluster node 106 and the cluster node 108 may receive two separate tasks, but can operate on data located within the data store 306 that is shared amongst the cluster nodes 106-110.

Figure 4:
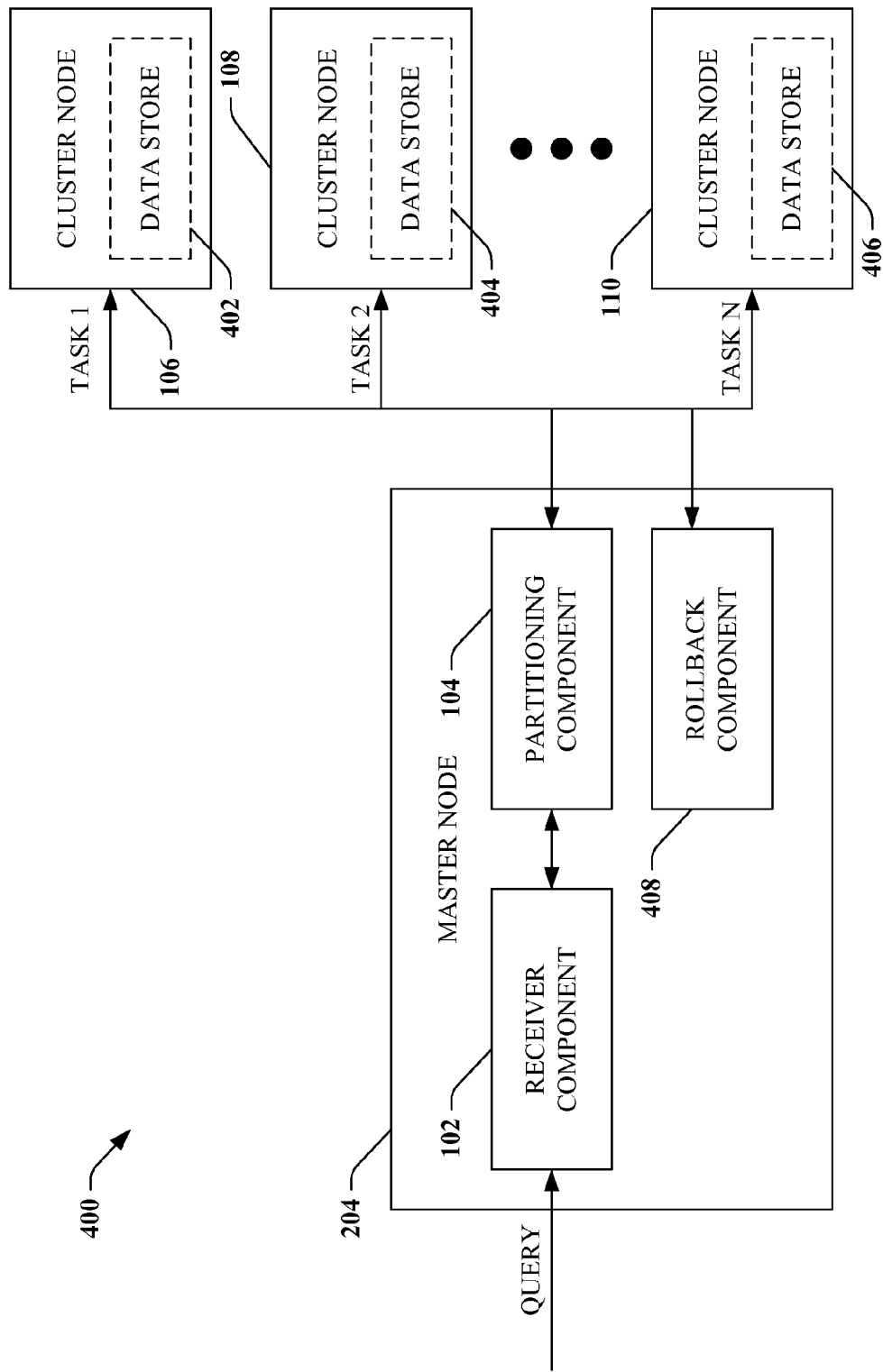
FIG. 4 is a block diagram of a system that uses a shared nothing architecture in connection with processing very large amounts of data.

With reference now to FIG. 4, a system 400 for preparing large volumes of data for analytical processing is illustrated. The system 400 includes the master node 204, which comprises the receiver component 102 and the partitioning component 104. As detailed above, the receiver component 102 receives an SQL query from a client, and the portioning component 104 analyzes the query to determine multiple tasks that define the query. For example, a task can be designed to operate on particular portions of data that are known to be associated with one of the cluster nodes 106-110. Thus tasks can be assigned to a particular cluster node and/or retrieved by a certain cluster node in accordance with data associated with the cluster node. In more detail, each of the cluster nodes 106-110 is associated with a data store 402-406, such that there need not be shared storage amongst the plurality of cluster nodes 106-110.

Data residing within the data stores 402-406 can be desirably formatted in particular matters and can be placed within certain cluster nodes based upon their relationships with known tasks. For example, data resident within the data store 402 can be associated with a first set of tasks while data resident within the data store 404 can be associated with a second set of tasks. Moreover, data sets can be categorized as partitioned tables and snowflake dimensions. Each partition of data sets within the data stores 402-406 can be stored on multiple cluster nodes for redundancy in the case of a node failure. For instance, data can be stored in comma separated or binary form, compressed or uncompressed. Dimension data can be retained in flat files or in an SQL server database, and can be loaded into memory of the master node 204 and the cluster nodes 106-110 and can be refreshed when such data changes.

As stated above, the partitioning component 104 can partition the SQL query into multiple tasks, where an individual task needs data only within the boundaries of a particular data partition (and can therefore be processed by an individual cluster node). For instance, a particular task can be assigned specifically to cluster node 106 as such node 106 is the node that includes data required by the task. The cluster node 106 can load the required data files using efficient scattered disk reads, for example, and can place the data into an internal cache. The cluster node 106 can thereafter execute the task against the partition of data identified within the task. SQL joins, for example, on partition keys can be optimized to minimize disk access, and internal containers that retain intermediate results associated with the query can be lock-free and optimized for a multi-CPU system. Results from such processing can be provided to the master node 204 as the results become available.

The system 400 can additionally include a rollback component 408 that enables data to be rolled back to a known good state in case of data corruption during a data load. The rollback component 408 can be utilized to create a snapshot of data within the system 400, such that file names along with sizes are captured for rollback if, for example, a load of logs from one or more web servers fails. Often, data subject to loading is not organized to enable efficient querying (e.g., such data is not sorted and not partitioned with the possible exception of being partitioned by time). As data is loaded it can be reorganized using one or more distributed sort algorithms according to a certain partitioning schema. Each resultant partition can be handled by an assigned cluster node. Thereafter, additional copies of data for partition can be placed on one or more other nodes for data redundancy. If, after the load and partition, there is data corruption, the rollback component 408 can return data within the system 400 to a previous state.

Figure 5:
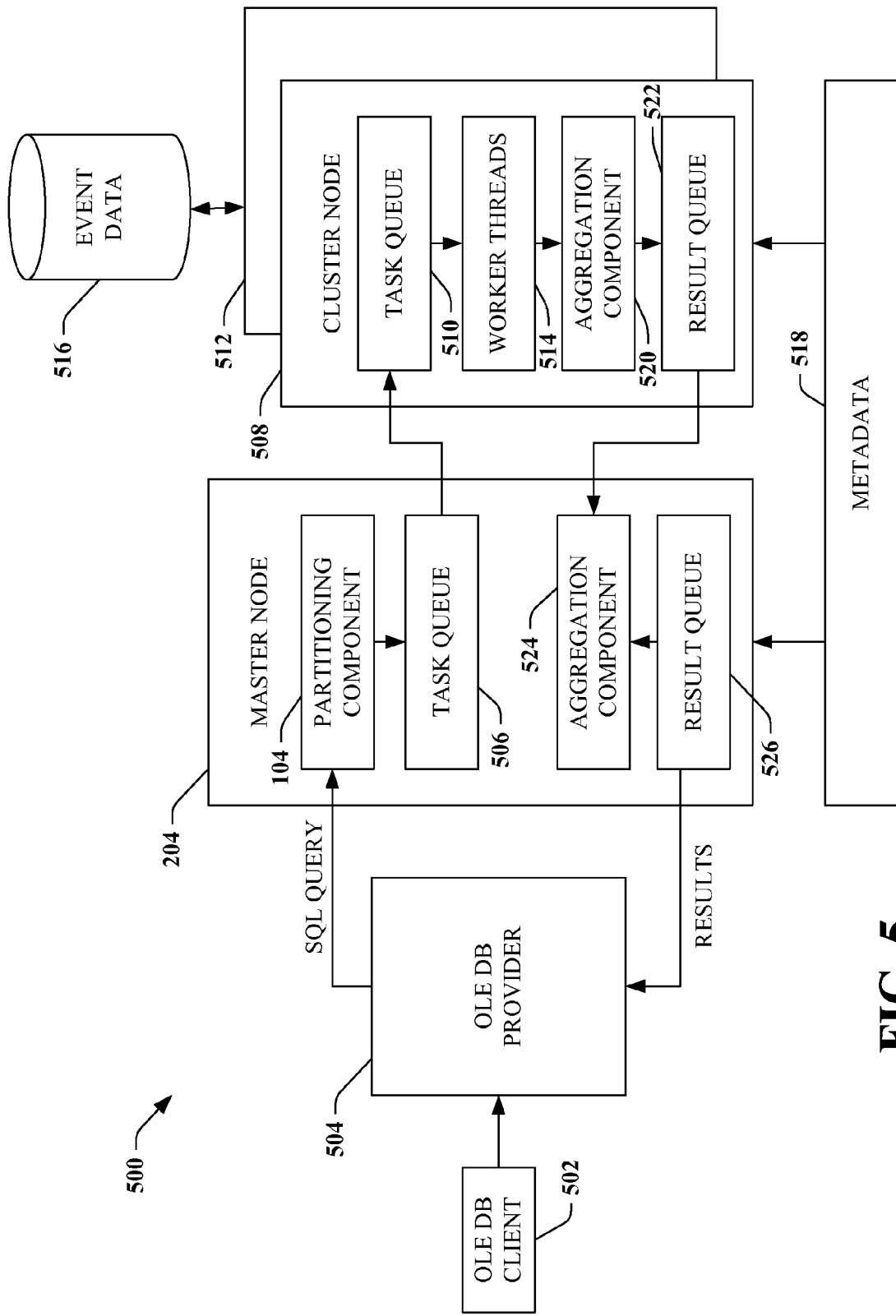
FIG. 5 is a block diagram of a data processing system in connection with a very large database.

With reference now to FIG. 5, a system 500 that facilitates preparing large quantities of data for analytical processing is illustrated. The system 500 includes an OLE DB client 502, which can be any suitable client, including a spreadsheet application, a SQL server, and/or the like. The OLE DB client 502 can be communicatively coupled to an OLE DB provider 504, which can be a driver, for instance. A SQL query, for example, can be generated by or through the OLE DB client 502 and/or the OLE DB provider 504. The master node 204 can receive the SQL query, and the partitioning component 104 within the master node 204 can determine a plurality of tasks that can be executed by one or more cluster nodes to effectively execute the SQL query. When the partitioning component 104 determines the tasks, they can be placed within a task queue 506, which can order the tasks by importance or any other suitable ordering.

Tasks within the task queue 506 can be provided to a cluster node 508, and more particularly to a task queue 510 within the cluster node 508. Other cluster nodes 512 can be associated with similar components as described with respect to the cluster node 510. The master node 204 can assign tasks to the cluster node 508 and/or the cluster node 508 can retrieve tasks from the master node 204. Additionally, while not shown, the cluster node 508 can be associated with sub-cluster nodes, wherein such sub-cluster nodes can be assigned or retrieve tasks from the task queue 510. In a shared nothing architecture, cluster nodes may be tasked to retain particular data, and thus may be designated to perform certain tasks. Tasks from the task queue 510 can be executed by one or more worker threads 514 within the cluster node 508. As described above, the worker threads 514 may be associated with certain tasks. Additionally, event data 516 and/or metadata 518 can be analyzed by the cluster node 508 to determine which tasks to take retrieve. The master node 204 and the cluster node 508 can communicate by way of unreliable messaging. Additionally, cluster nodes can communicate amongst themselves through use of unreliable (one way) messaging.

The cluster node 508 additionally includes an aggregation component 520 that aggregates data resulting from execution of the worker threads 514. The aggregation component 520 can additionally aggregate data that is associated with sub-clusters that were assigned or retrieved tasks from the task queue 510. Aggregated data can thereafter be provided to a result queue 522 on the cluster node 508. The master node 204 can request data from the result queue 522 and/or the cluster node 508 can automatically provide data from the result queue 522 to the master node 204. Results from result queues of several cluster nodes can be received by an aggregation component 524 within the master node 204, and results of such aggregation can be provided to a result queue 526. For example, the master node 204 can be assigned to aggregate data from multiple cluster nodes. Manners for aggregating data can be based at least in part upon the metadata 518 that is accessible by the master node 204. Data from the result queue in the master node 204 can then be provided to the OLE DB provider 504 and then returned to the OLE DB client 502. Data provided to the OLE DB client 502 is then available for analytic processing.

Figure 6:
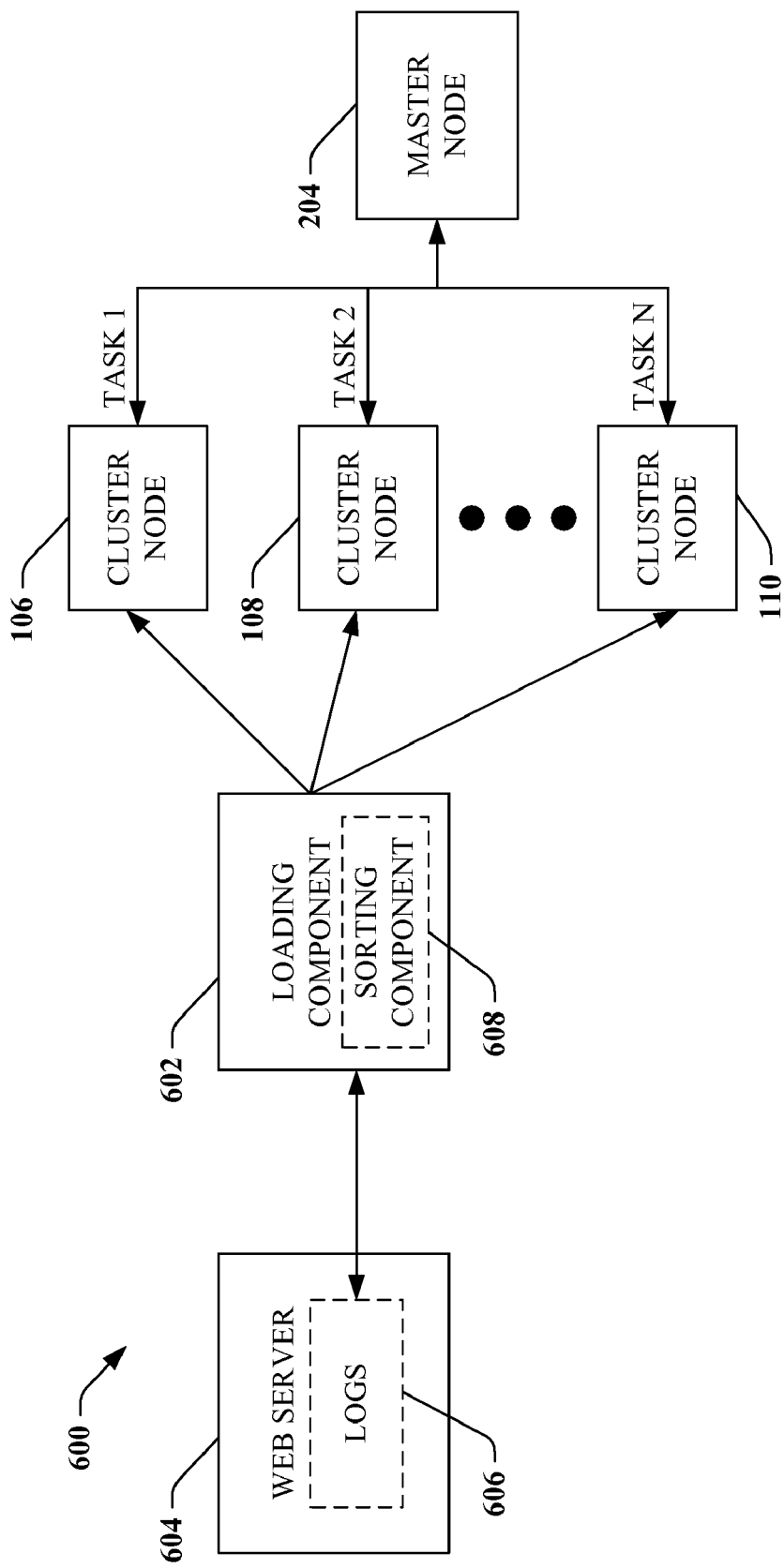
FIG. 6 is a block diagram of a system that facilitates loading data for processing.

Now referring to FIG. 6, a system 600 that facilitates preparing large quantities of data for querying and/or analytical processing is illustrated. The system 600 includes a loading component 602 that can be communicatively coupled to a web server 604 and receive logs 606 resident within the web server 604. For example, the loading component 602 can request the logs 606 from the web server 604 and/or the web server 604 can push the logs 606 to the loading component 602. For instance, the request/pushing of the logs 606 can be done according to remaining data storage capacity on the web server 604, periodically, etc. In an example, the logs 606 can be W3C logs.

Typically, the logs 606 extracted from the web server 604 will not be ordered properly for efficient querying. For example, the logs 606 may not be partitioned except possibly by time. Accordingly, the loading component 602 can include a sorting component 608 that can reorganize the data and provide it to a data storage unit that is shared by the plurality of cluster nodes 106-110 and/or to data stores within the plurality of cluster nodes 106-110. For example, as alluded to above, each cluster node may be configured to perform certain tasks on particular data and/or types of data. Therefore, the sorting component 608 can be tasked to provide certain data partitions to specific cluster nodes. For instance, the sorting component 608 can utilize distributed sort algorithms that accord to a defined partitioning schema and each resulting partition can be assigned to a certain cluster node 106-110 or portion of a shared data storage unit. For redundancy purposes, one or more additional copies of partitions can be assigned to different nodes for redundancy.

In more detail, data sets resultant from the sorting component 608 can be categorized as partition tables and snowflake dimensions, wherein a particular partition table can be a fact table utilized for storing the event data 516 (FIG. 5). The fact table can have a primary partitioning sequence of keys and undertake a secondary sub-partitioning based upon a timestamp of one or more events. Data can be retained on the cluster nodes 106-110 in comma separated form, compressed or uncompressed. Dimension data can be stored in flat files and/or upon an SQL Server database, for example, and can be loaded into memory of the master node 204 and the cluster nodes 106-110 and refreshed as the dimension data changes.

Once the logs 606 have been loaded and organized, the master node 204 can receive an SQL query and partition such query into multiple tasks. The tasks can then be assigned or retrieved by certain cluster nodes according to partitions associated therewith. As described above, one way messaging can be undertaken between the master node 204 and the cluster nodes 106-110 and/or between cluster nodes (and sub-cluster nodes). Queries provided to the master node 204 can be utilized in connection with preparing data associated with the cluster nodes 106-110 for analytical purposes, such as determining user interests, selectively providing advertisements to users, etc.

In another example, in connection with preparing raw data from the logs 606 for querying (e.g., placing such data in partitioned and sorted format), the master node 204 can select certain cluster nodes as being responsible for reading the raw logs 606. The selected cluster nodes are hereinafter referred to as "readers." The selection of the readers can be based upon computational ability of cluster nodes, resource availability, or any other suitable criteria. The master node 204 can also select cluster nodes as being responsible for hosting partitioned and sorted data, and such selected nodes are hereinafter referred to as "writers." The master node 204 can prepare the reader nodes and writer nodes to communicate amongst one another regarding when data reads are complete, writes are complete, and/or the like.

The reader nodes (upon receipt of a command by the master node 204) can retrieve or receive the logs 606 from the web server 604, and can relay certain logs and/or portions thereof to particular writer nodes (e.g. according to a partition table). Provision of logs to certain cluster nodes (writers) is important to enable parallel processing. The writer nodes can receive the data for each partition by utilizing in-memory buffers—data can also be written to temporary disk storage if an amount of data exceeds the capacity of physical memory.

Upon the reader nodes receiving all relevant logs within the web server 604, the reader nodes can provide a notification to the master node 204. The reader nodes can flush all buffers that include data received from the web server 604 and await receipt of an acknowledgement that the flushed data has been received by one or more appropriate writer nodes. The reader nodes can then notify the master node 204 that provision of data to the writer nodes is complete. When the writer nodes determine (or receive a notification) that they have all relevant data from the reader nodes, the writer nodes can partition received logs into a format desired for querying (e.g., Table (field 1, field 2, field 3, ...)). The writer nodes can thereafter notify the master node 204 that the logs are in a final format. The master node 204, if a shared nothing architecture is employed, can command writer nodes to replicate newly written data to other nodes that are to host additional copies of partitioned data.

Figure 7:
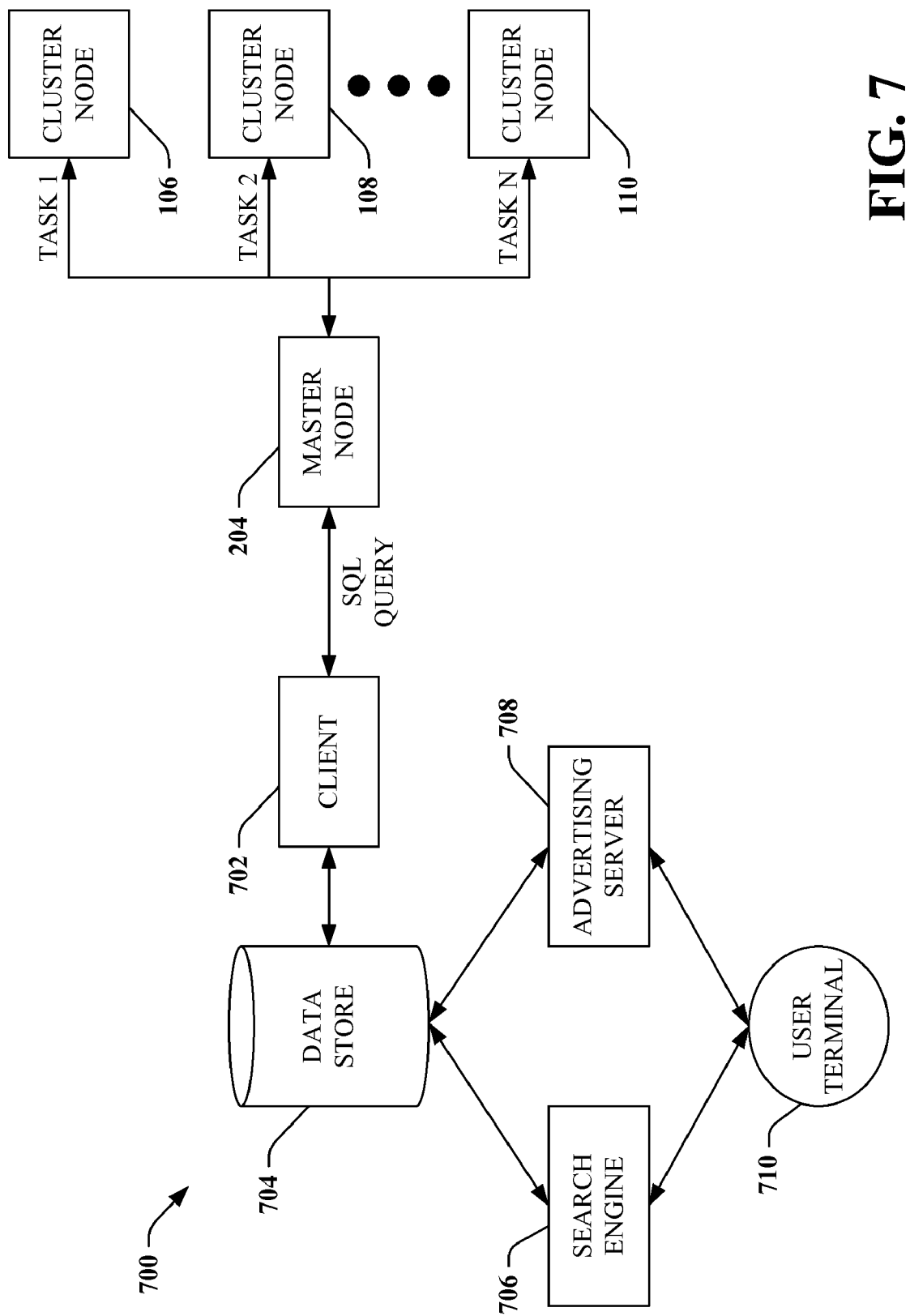
FIG. 7 illustrates use of analytical processing of data in connection with a search engine and/or advertising server.

With reference now to FIG. 7, a system 700 that illustrates a practical application of the master node 204 and the cluster nodes 106-110 is illustrated. The system 700 includes a client 702, such as an OLE DB client, which can provide an SQL query to the master node 204. As described above, the master node 204 can partition the queries into several tasks, and such tasks can be executed by the cluster nodes 106-110. Results from executing the tasks can be aggregated at the cluster nodes 106-110 and at the master node 204, and can then be provided to the client 702. The client 702 can be communicatively coupled to a data store 704, and results of the SQL query can be retained therein.

As an example, the SQL query can be associated with a particular Internet user, such as locating recent searches undertaken by the user, web pages visited by the user, items purchased by the user, and/or the like. A search engine 706 and/or an advertising server 708 can then perform data mining operations or utilize other intelligent algorithms to selectively provide content to the user. For instance, the search engine 706 can receive a query from a user terminal 710 (which may be associated with a particular user, or a certain user may be logged into the user terminal 710). By analyzing content of the data store 704 that is pertinent to the user, the search engine 706 can intelligently order search results and provide content to such user. Similarly, the advertising server 708 can selectively provide advertisements to the user terminal 710 based upon content of the data store 704.

In a detailed example, the cluster nodes 106-110 can retain partitioned data received from web servers, such as W3C logs, as well as any other suitable data. In another example, storage can be shared amongst the cluster nodes 106-110 to retain the data. When a user logs onto service, the client 702 (or other suitable computing entity) can determine an identity of the user. One or more SQL queries can be automatically generated to retrieve data relating to the user logged in at the user terminal 710. Resulting data can be provided to the data store 704 and used in connection with providing a user with customized/enhanced content and/or advertisements.

Referring now to FIGS. 8-11, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
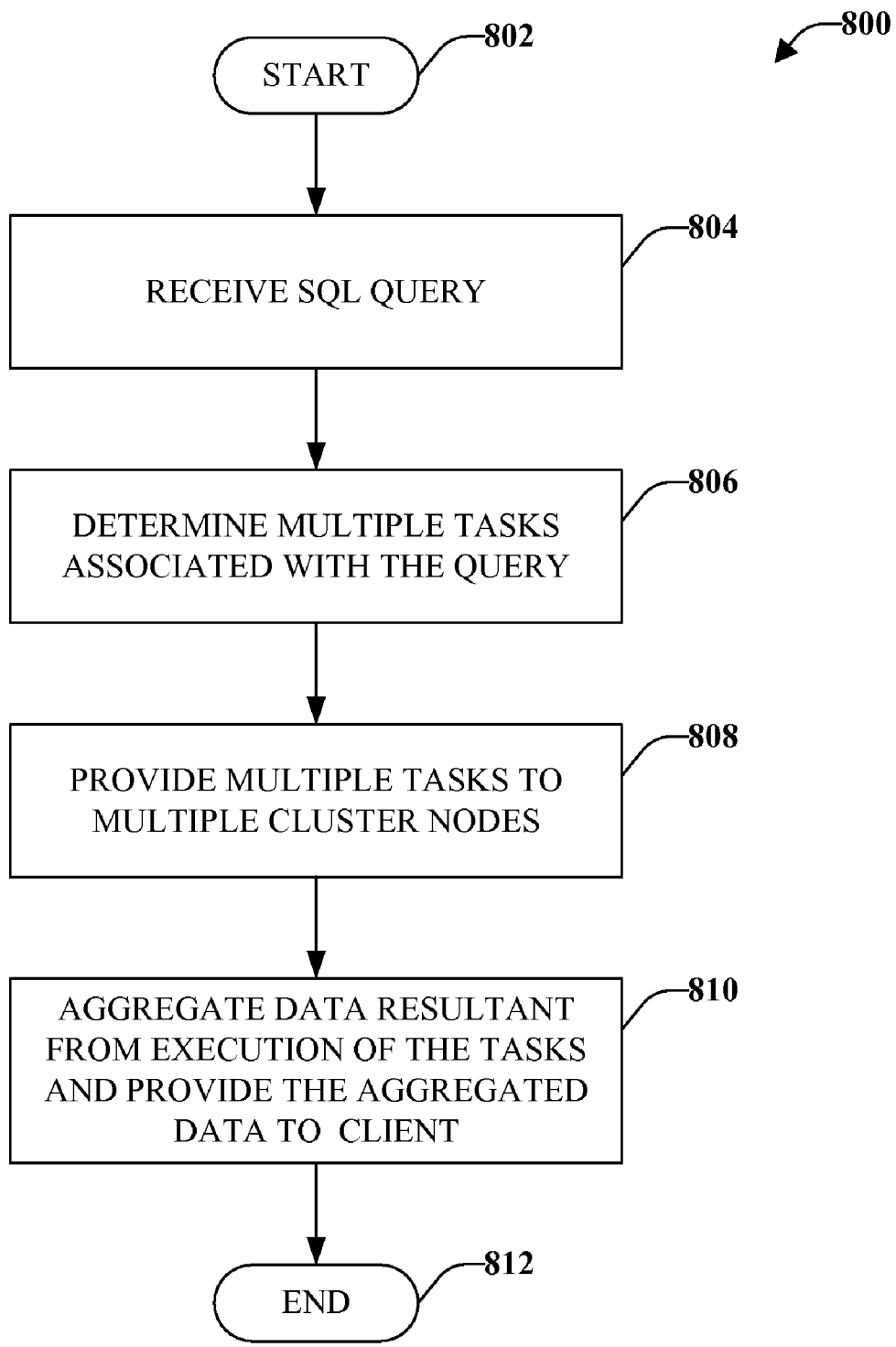
FIG. 8 is a representative flow diagram illustrating a methodology for performing preparatory processing on large amounts of data to enable analysis thereof.

Referring solely to FIG. 8, a methodology 800 for quickly preparing a vast amount of data (e.g., terabytes) for analytical processing is illustrated. The methodology 800 initiates at 802, and at 804 a SQL query is received. For example, the SQL query can be generated automatically when a user provides log-in information, when one or more users are identified through analysis of an IP address, or any other suitable manner for identifying the user. The SQL query can be generated at an OLE DB client and passed through an OLE DB provider, which can be a driver.

At 806, multiple tasks associated with the SQL query are determined. For instance, predefined tasks can be assigned to SQL queries, wherein such predefined tasks are to be run on certain cluster nodes. For example, a "shared nothing" architecture can be utilized, such that specific data partitions are assigned to certain cluster nodes upon loading data into the cluster nodes. Tasks that are assigned to the cluster nodes can be directed to the specific data partitions. At 808, the multiple tasks are provided to multiple cluster nodes, wherein each task may be desirably executed by a certain cluster node. Additionally, cluster nodes can be associated with sub-cluster nodes, such that a multi-level hierarchical computing structure is utilized to perform the tasks. For instance, a task can be provided to a particular cluster node, and thereafter the task can be partitioned into multiple sub-tasks and provided to several sub-cluster nodes. Additionally, each sub-cluster node may be configured to perform certain sub-tasks, wherein sub-cluster nodes request particular sub-tasks and/or are assigned certain sub-tasks.

At 810, once the tasks and/or sub-tasks have been executed, data resulting from the sub-tasks can be aggregated and provided to a cluster node and/or master node that is above the cluster node (or sub-cluster node) that is executing the task or sub-task in the described hierarchy. Data can be aggregated as it is passed up the hierarchy to the master node, which can perform a final aggregation and relay the resultant data back to the OLE DB client. When communications are undertaken between the master nodes and cluster nodes, between cluster nodes, between cluster nodes and sub-cluster nodes, and/or between sub-cluster nodes, such communications can be by way of unreliable messaging. This enables processing of tasks to be completed more expediently when compared with conventional very large database processing systems/methods. Further, the use of SQL enables a common interface to be employed. The methodology 800 then completes at 812.

Figure 9:
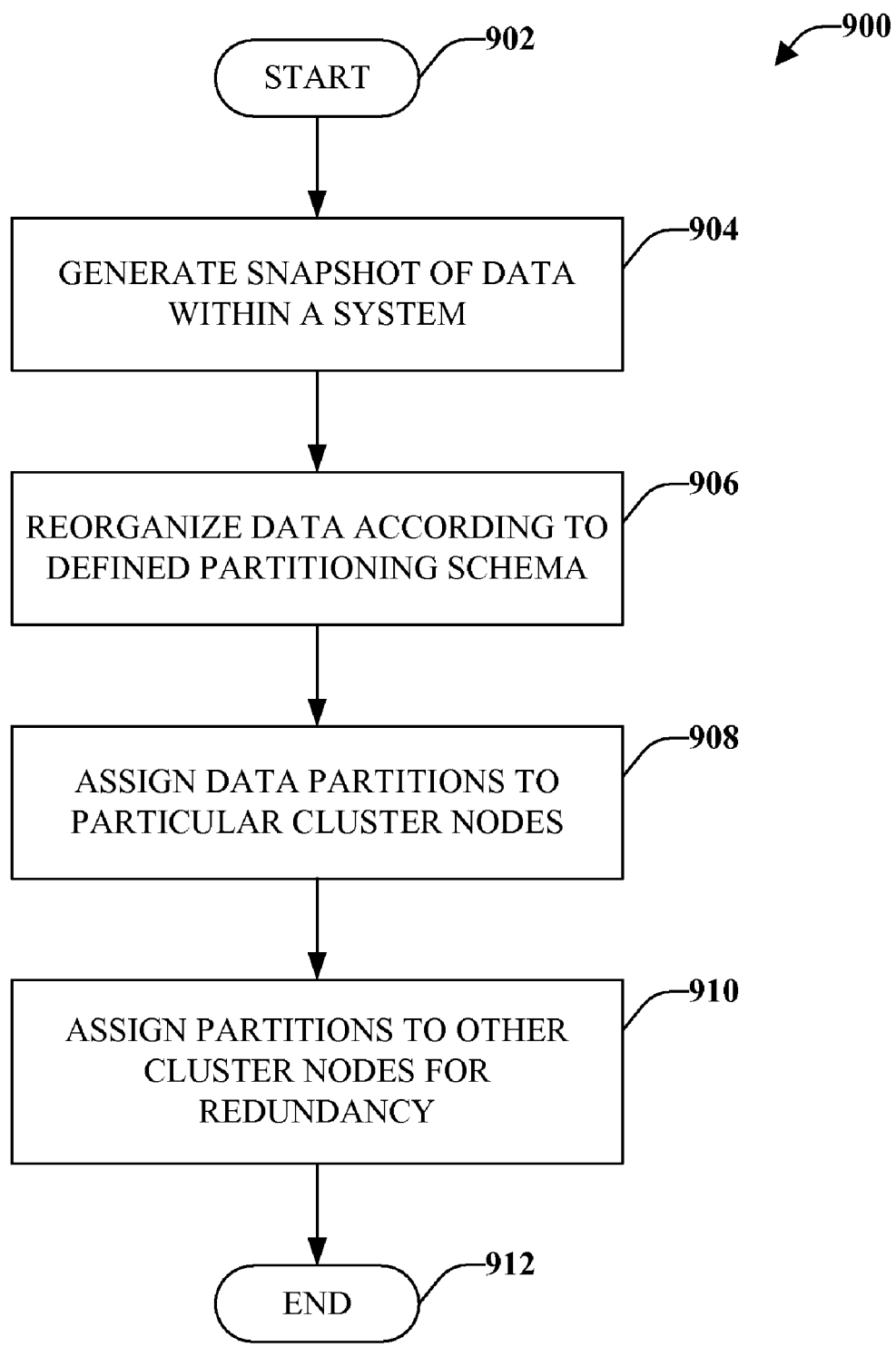
FIG. 9 is a representative flow diagram illustrating a methodology for loading data into a data processing system.

Now turning to FIG. 9, a methodology 900 for loading a large amount of data into a data processing system is illustrated. The methodology 900 starts at 902, and at 904 a snapshot of data existent within a system is taken prior to loading data. Thus, if there is corrupt data or data is loaded incorrectly, the system can be "rolled back" to a known good state. For example, file names and sized can be captured for rollback of a load operation is unsuccessful. At 906, data that is desirably loaded is reorganized according to a defined partitioning schema. At 908, certain partitions are provided to specific cluster nodes. Tasks can then be assigned to the cluster node or requested by the cluster node, wherein the tasks are associated with the partitions. At 910, data partitions are provided to other cluster nodes for purposes of redundancy. The methodology 900 then completes at 912.

Figure 10:
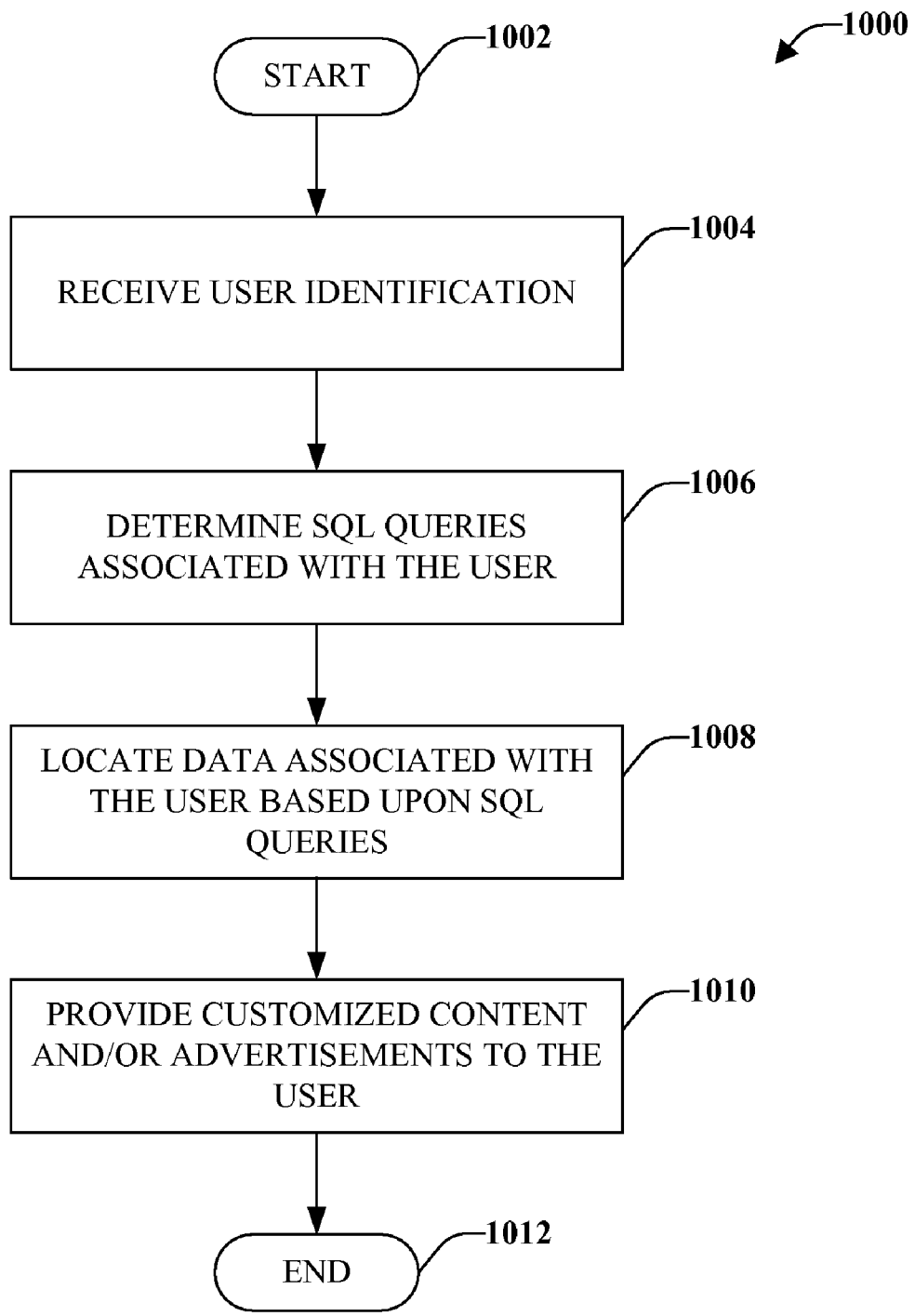
FIG. 10 is a representative flow diagram illustrating a methodology for providing customized search content and/or advertisements to a user.

With reference to FIG. 10, a methodology 1000 for providing customized content and/or advertisements to a user is illustrated. The methodology 1000 starts at 1002, and at 1004 a user identification is received. For example, a user can log onto an Instant Messenger service, log onto an email service, provide an IP address with respect to a computing device, and/or the like. Thus, any suitable manner for receiving/determining a user identification is contemplated and intended to fall under the scope of the hereto-appended claims. At 1006, SQL queries with respect to the identified user are ascertained. For instance, to prepare data for analytical processing with respect to the user, queries that are designed to locate and aggregate data relating to the user (e.g., information collected about the user, such as search logs, information related to the user, such as demographic information, . . . ).

At 1008, data associated with the user is located (collected and aggregated) from a very large database which can include terabytes of data. For example, the hierarchical architecture including at least one master node and at least one cluster node can be utilized to quickly and efficiently prepare data for analytical purposes. At 1010, content and/or advertisements are provided to the user upon analyzing the located data. Thus, search results can be optimized, advertisements can be selectively provided based upon inferred user interests, etc. The methodology 1000 then completes at 1012.

Figure 11:
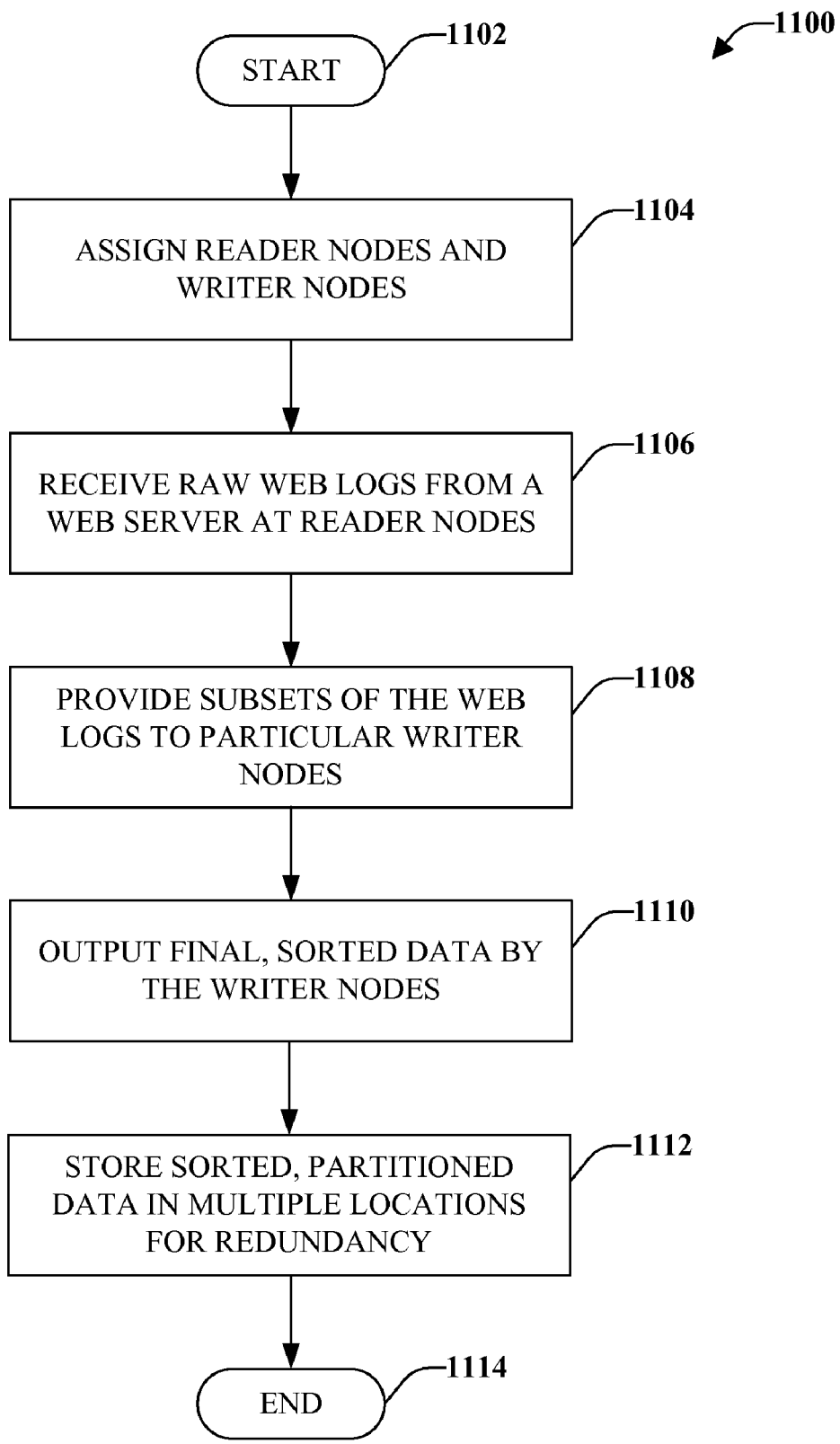
FIG. 11 is a representative flow diagram illustrating a methodology for sorting web logs.

Now referring to FIG. 11, a methodology 1100 for quickly preparing large amounts of data for querying and/or analytical processing is illustrated. For instance, web logs retained within web servers typically are not sorted (except maybe by time). To enable querying of the web logs in a system that utilizes a hierarchical arrangement of computing nodes, however, the web logs need to be formatted and sorted in a particular manner (e.g., Table(field 1, field 2, . . . )) and associated with certain nodes. The methodology 1100 initiates at 1102, and at 1104 cluster nodes are assigned as reader nodes or writer nodes by a master node, wherein reader nodes are tasked with receiving/retrieving web logs from a web server and providing such logs to appropriate writer nodes, and the writer nodes are tasked with formatting web logs in a desired manner.

At 1106, web logs are received from a web server at the reader nodes. For instance, portions of all web logs (arranged by time) can be provided to certain reader nodes. Once the reader nodes have received all relevant web logs, the reader nodes can indicate to the master node that reading has been completed. At 1108, subsets of the web logs are provided to particular writer nodes. For example, the reader nodes can utilize a distribution table to ensure that certain web logs are provided to particular nodes. Once each of the web logs are provided to the writer nodes, the reader nodes can await confirmation of receipt and then inform the master node that their tasks have been completed.

At 1110, the writer nodes can sort their received web logs and generate final, sorted data. Such data can be formatted to enable efficient querying. Additionally, the data written can be retained within certain nodes to enable parallel processing (as described above). The writer nodes, upon completion of generating the final sorted data, can inform the master node that such writing has been completed, and that the data is ready for querying. At 1112, the final, sorted data partitions are stored in multiple locations for redundancy purposes, and the methodology 1100 completes at 1114.

Figure 12:
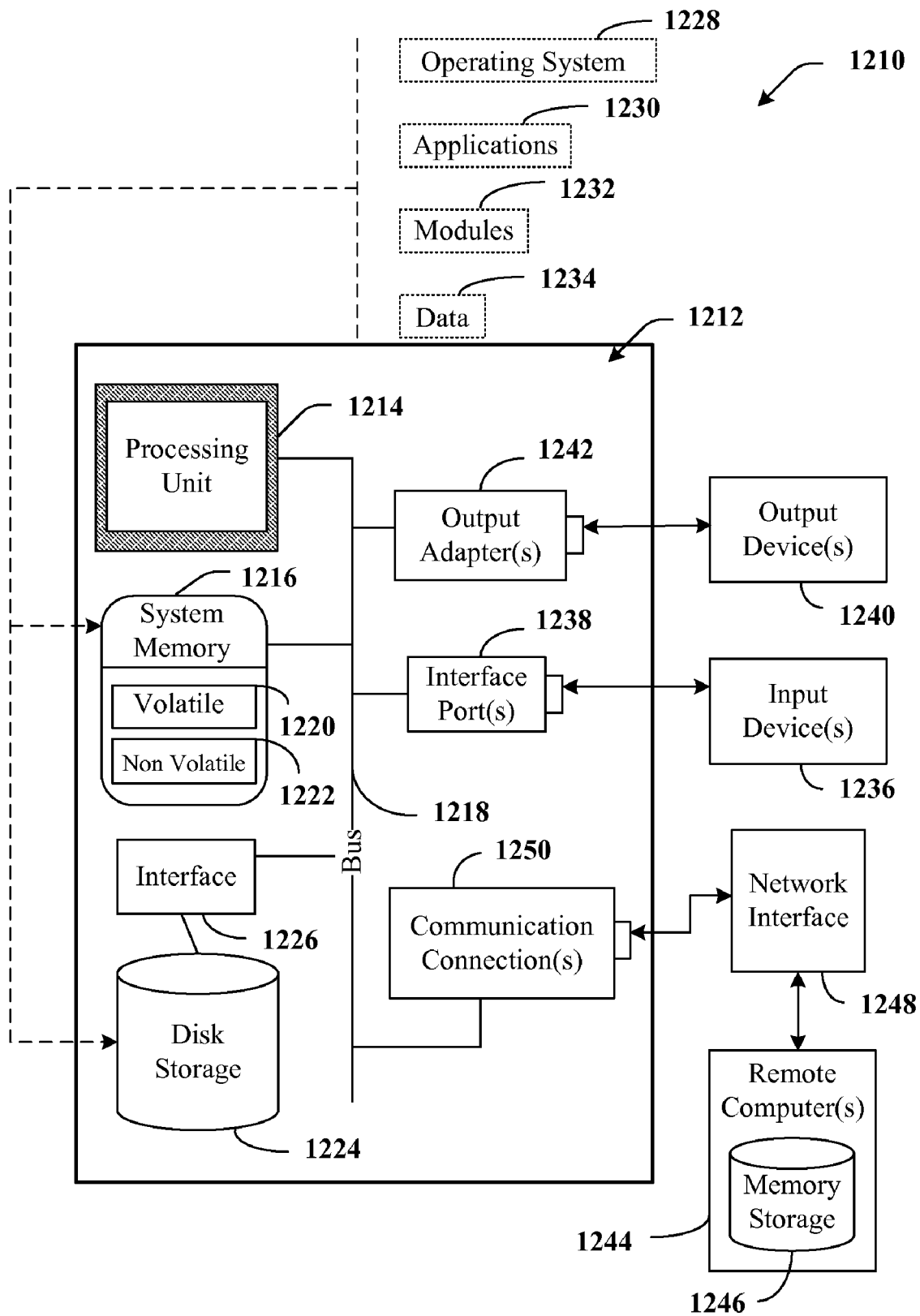
FIG. 12 is a schematic block diagram illustrating a suitable operating environment.

In order to provide additional context for various aspects of the claimed subject matter, FIG. 12 and the following discussion are intended to provide a brief, general description of a suitable operating environment 1210 in which various aspects of the claimed subject matter may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the claimed subject matter, such as efficiently preparing large quantities of data for analytical processing, includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
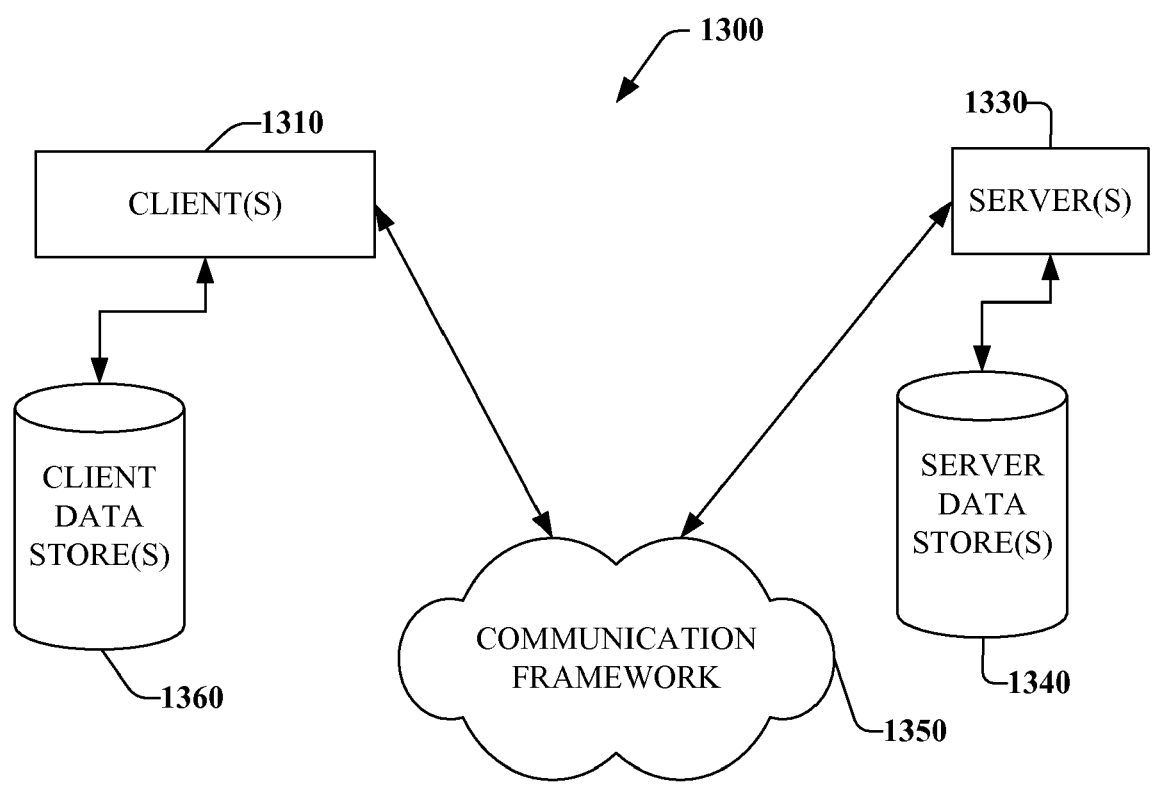
FIG. 13 is a schematic block diagram of a sample-computing environment.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data processing, comprising:
 a processor that executes the following computer executable components stored on a computer readable storage medium:
 a receiver component that receives a structured query language (SQL) query;
 a partitioning component that partitions the SQL query into multiple tasks and provides the tasks to multiple cluster nodes for processing, wherein the multiple cluster nodes include a hierarchical arrangement of sub-clusters of nodes, at least one of the cluster nodes includes a second partitioning component that partitions the received tasks into multiple sub-tasks, the at least one of the cluster nodes determine for one or more sub-tasks whether to execute the sub-task at the at least one cluster node or to provide the sub-task to a first sub-cluster for execution, and further wherein the multiple tasks that are provided to the multiple cluster nodes are assigned based on the association of the data content accessible by each of the multiple cluster nodes with the data content required by the one or more tasks; and
 a monitoring component that monitors the progress of a first task at a first cluster of nodes of the multiple clusters of nodes, wherein the monitoring component determines the first task is not completed within a first threshold of time, and further wherein the monitoring component reassigns the first task from the first cluster of nodes of the multiple clusters of nodes to a second cluster of nodes of the multiple clusters of nodes upon determining the first task was not completed in the first threshold of time.

2. The system of claim 1, further comprising an aggregation component that aggregates processed data received from the clusters.

3. The system of claim 1, further comprising a rollback component that initiates a rollback of data to a known good state if a load of data into the system fails.

4. The system of claim 1, a subset of the cluster nodes act as reader nodes that read web logs from a web server and provide a subset of the web logs to a particular cluster nodes that act as writer nodes and format the data in a suitable form for querying.

5. The system of claim 1, further comprising a monitoring component that monitors the multiple cluster nodes to ensure that the multiple tasks are being performed.

6. The system of claim 1, unreliable communications are undertaken between the partitioning component and the multiple cluster nodes.

7. The system of claim 1, the cluster nodes communicate with one another by way of unreliable messaging.

8. The system of claim 1, the at least one cluster node includes an aggregation component that aggregates data resultant from execution of the sub-tasks at sub-clusters associated with the cluster node.

9. The system of claim 1, the plurality of clusters reside within a shared nothing storage architecture.

10. The system of claim 1, further comprising a loading component that loads data into the plurality of cluster nodes from a web server, the loading component employs one or more distributed sort algorithms to assign one or more data partitions to one or more certain clusters.

11. The system of claim 1, further comprising a search engine that utilizes results of the SQL query to selectively provide content to a user.

12. The system of claim 1, further comprising an advertisement server that utilizes results of the SQL query to selectively provide advertisements to a user.

13. A method for preparing large amounts of data for analytical processing, comprising:
 receiving a query;
 utilizing a processor to determine multiple tasks based on the query;
 providing the multiple tasks to a plurality of cluster nodes through usage of one-way messaging, wherein the plurality of cluster nodes comprises a hierarchical arrangement of multiple cluster nodes that are subservient to one or more parent cluster nodes, and further wherein the multiple tasks that are provided to the plurality of cluster nodes are assigned based on the association of the data content accessible by each of the plurality of cluster nodes with the data content required by the one or more tasks;
 partitioning the tasks into a plurality of sub-tasks at one or more of the plurality of cluster nodes;
 selecting one or more sub-tasks at the one or more of the plurality of cluster nodes;
 providing the selected subtasks to multiple cluster nodes that are subservient to the cluster node that is providing the selected subtasks;
 monitoring the progress of a first task at a first cluster node of the multiple cluster nodes, wherein the monitoring includes determining whether the first task is completed within a first threshold of time, and reassigning the first task from the first cluster node of the multiple cluster nodes to a second cluster node of the multiple cluster nodes if the first task is not completed within the first threshold of time;
 aggregating results provided from the plurality of cluster nodes with respect to the multiple tasks; and
 providing the aggregated results to an object linking and embedding database (OLE DB) client.

14. The method of claim 13, further comprising:
performing data mining on the aggregated results; and
providing at least one of search content and an advertisement based at least in part on the data mining.

15. The method of claim 13, the received query is an structured query language (SQL) query.

16. The method of claim 13, further comprising:
receiving an identity of a user; and
generating the query based at least in part upon the received identity.

17. A data processing system, comprising:
means for receiving a structured query language (SQL) query that is to be executed over multiple terabytes of data;
means for determining multiple tasks associated with the received SQL query and providing the multiple tasks to a plurality of cluster nodes for processing, the plurality of cluster nodes comprises a hierarchical arrangement of multiple cluster nodes that are subservient to one or more parent cluster nodes;
means for partitioning at least one of the tasks into a plurality of sub-tasks at one or more of the plurality of cluster nodes;
means for determining one or more sub-tasks at the one or more of the plurality of cluster nodes;
means for providing the determined sub-tasks to multiple cluster nodes that are subservient to the cluster node that is providing the determined sub-tasks;
means for monitoring the progress of a first task at a first cluster of nodes of the multiple clusters of nodes, wherein the monitoring component determines the first task is not completed within a first threshold of time; and
means for reassigning the first task from the first cluster of nodes of the multiple clusters of nodes to a second cluster of nodes of the multiple clusters of nodes if the first task is not completed within the first threshold of time.

* * * * *